US012675498B2

(12) United States Patent
Fan et al.

(10) Patent No.: US 12,675,498 B2
(45) Date of Patent: *Jul. 7, 2026

(54) DATA PIPELINE CONTROLLER

(71) Applicant: AT&T Intellectual Property I, L.P., Atlanta, GA (US)

(72) Inventors: James Fan, San Ramon, CA (US); Jeffrey Aaron, Atlanta, GA (US); Sanjay Agraharam, Marlboro, NJ (US); Arun Gupta, Manalapan, NJ (US); Michelle Martens, Freehold, NJ (US); Steven Polston, Flemington, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 32 days.

This patent is subject to a terminal disclaimer.

(21) Appl. No.: 18/662,894

(22) Filed: May 13, 2024

(65) Prior Publication Data

US 2024/0296169 A1      Sep. 5, 2024

Related U.S. Application Data

(63) Continuation of application No. 16/831,999, filed on Mar. 27, 2020, now Pat. No. 11,983,189.

(51) Int. Cl.
G06F 16/25 (2019.01)
G06F 9/30 (2018.01)
(Continued)

(52) U.S. Cl.
CPC .......... G06F 16/254 (2019.01); G06F 9/3005 (2013.01); G06F 9/30079 (2013.01);
(Continued)

(58) Field of Classification Search
CPC .. G06F 16/254; G06F 9/3005; G06F 9/30079; G06F 9/3812; G06F 16/212; G06F 16/2291; G06F 16/24573; G06F 16/258
See application file for complete search history.

(56) References Cited

U.S. PATENT DOCUMENTS 7,299,237 B1 * 11/2007 Clark .................... G06F 16/214
7,809,672 B1 * 10/2010 Tenorio .............. G06Q 30/0629
707/694

(Continued)

OTHER PUBLICATIONS

Heller, "Query Your Network Like a Database to Gain Knowledge and Simplify Operations", In Blog Engineering Network Product; Jan. 23, 2019, 15 pages.

(Continued)

*Primary Examiner* — Ajay M Bhatia
*Assistant Examiner* — Zuheir A Mheir

(57) ABSTRACT

A processing system including at least one processor may obtain a first ontology of a first type of data pipeline component, map the first ontology to a second ontology for a second type of data pipeline component that is stored in a catalog of data pipeline component types, provide a second data schema for the second type of data pipeline component as a template for a first data schema for the first type of data pipeline component, and add the first type of data pipeline component to the catalog of data pipeline component types, where the adding comprises storing the first ontology and the first data schema for the first type of data pipeline component in the catalog of data pipeline component types.

20 Claims, 3 Drawing Sheets

(51) Int. Cl.

| | | |
|---|---|---|
| *G06F 9/38* | (2018.01) | |
| *G06F 16/21* | (2019.01) | |
| *G06F 16/22* | (2019.01) | |
| *G06F 16/2457* | (2019.01) | |

(52) U.S. Cl.
CPC .......... *G06F 9/3812* (2013.01); *G06F 16/212* (2019.01); *G06F 16/2291* (2019.01); *G06F 16/24573* (2019.01)

(56) References Cited

U.S. PATENT DOCUMENTS

| | | | | |
|---|---|---|---|---|
| 8,102,869 | B2 * | 1/2012 | Brown | .................... H04L 67/12 |
| | | | | 370/463 |
| 9,396,037 | B2 * | 7/2016 | Morsi | ................... G06F 9/5083 |
| 9,922,108 | B1 * | 3/2018 | Meiklejohn | .......... G06F 16/289 |
| 11,238,048 | B1 | 2/2022 | Breeden | |
| 11,861,767 | B1 * | 1/2024 | Kong | ...................... G06F 16/26 |
| 2003/0172368 | A1 | 9/2003 | Alumbaugh | |
| 2004/0015783 | A1 | 1/2004 | Lennon | |
| 2005/0086360 | A1 | 4/2005 | Mamou | |
| 2007/0011147 | A1 * | 1/2007 | Falkenberg | ............. G06F 16/33 |
| 2012/0278271 | A1 | 11/2012 | Peoples | |
| 2015/0286969 | A1 | 10/2015 | Wamer | |
| 2016/0146971 | A1 | 5/2016 | Gerling | |
| 2017/0330081 | A1 | 11/2017 | Lindsley | |
| 2018/0027006 | A1 | 1/2018 | Zimmermann | |
| 2018/0052870 | A1 | 2/2018 | Stojanovic | |
| 2018/0052898 | A1 | 2/2018 | Allan | |
| 2018/0210955 | A1 * | 7/2018 | Crabtree | ................. H04L 67/12 |
| 2019/0243836 | A1 | 8/2019 | Nanda | |
| 2019/0377817 | A1 | 12/2019 | McCluskey | |
| 2020/0125540 | A1 * | 4/2020 | Thatte | ................... G06F 16/211 |
| 2020/0356428 | A1 | 11/2020 | Rama | |
| 2021/0173846 | A1 * | 6/2021 | Verma | ................... G06F 16/211 |

OTHER PUBLICATIONS

Bandara, et al., "An Ontological Framework for Semantic Description of Devices", (2004), Computer Science; 2 pages.

Dibowski, et al., "Ontology-Based Device Descriptions and Device Repository for Building Automation Devices", EURASIP Journal on Embedded Systems, vol. 2011, Article ID 623461; 17 pages.

Jarvenpaa, et al.,"The development of an ontology for describing the capabilities of manufacturing resources", Journal of Intelligent Manufacturing; Jun. 15, 2018, pp. 959-978, https://dol.org/10.1007/s10845-018-14276.

Rodriguez et al., "Automating the deployment of 5G Network Slices with ONAP", Orange Labs; Jul. 4, 2019, 8 pages. arXiv:1907.02278v1 [cs.NI].

Oasis, "TOSCA Simple Profile for Network Functions Virtualization (NFV) Version 1_0", Committee Specification Draft P3, Mar. 17, 2016,51 pages, https://docs.oasis-tosca-open.org/tosca/tosca-nfv/vl.0/csd03/tosca-nfv-v10-csd03.pdf.

* cited by examiner

300

DATA PIPELINE CONTROLLER

This application is a continuation of U.S. patent application Ser. No. 16/831,999, filed on Mar. 27, 2020, now U.S. Pat. No. 11,983,189, which is herein incorporated by reference in its entirety.

The present disclosure relates generally to data pipelines for transferring batch and streaming data via communications networks, and more particularly to methods, computer-readable media, and apparatuses for generating a data schema for a type of data pipeline component and storing an ontology and the data schema for the type of data pipeline component in a catalog of data pipeline component types.

BACKGROUND

A data pipeline is a set of data processing elements connected in series, where the output of one element is the input of the next element. The elements of a data pipeline may operate in parallel or in a time-sliced fashion. In addition, some amount of buffer storage may be provided between other elements. One subset of data pipelines includes extract, transform, and load (ETL) systems, which extract data from a data source, transform the data, and load the data into a database or data warehouse. ETL pipelines may run in batches, meaning that the data is moved in one large chunk at a specific time to the target, e.g., in regular scheduled intervals. A data pipeline is a broader term that refers to a system for moving data from one or more sources to one or more targets in a computing network environment. The data may or may not be transformed, and it may be processed in real time (or streaming) instead of batches. When the data is streamed, it may be processed in a continuous flow which is useful for data that is continuously updating, such as a data from a traffic monitoring sensor. In addition, the data may be transferred to any number of targets, which may include databases or data warehouses, as well as any number of automated systems, operator/user terminals, and so forth.

SUMMARY

Methods, computer-readable media, and apparatuses for generating a data schema for a type of data pipeline component and storing an ontology and the data schema for the type of data pipeline component in a catalog of data pipeline component types are described. For example, a processing system including at least one processor may obtain a first ontology of a first type of data pipeline component, map the first ontology to a second ontology for a second type of data pipeline component that is stored in a catalog of data pipeline component types, provide a second data schema for the second type of data pipeline component as a template for a first data schema for the first type of data pipeline component, and add the first type of data pipeline component to the catalog of data pipeline component types, where the adding comprises storing the first ontology and the first data schema for the first type of data pipeline component in the catalog of data pipeline component types.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
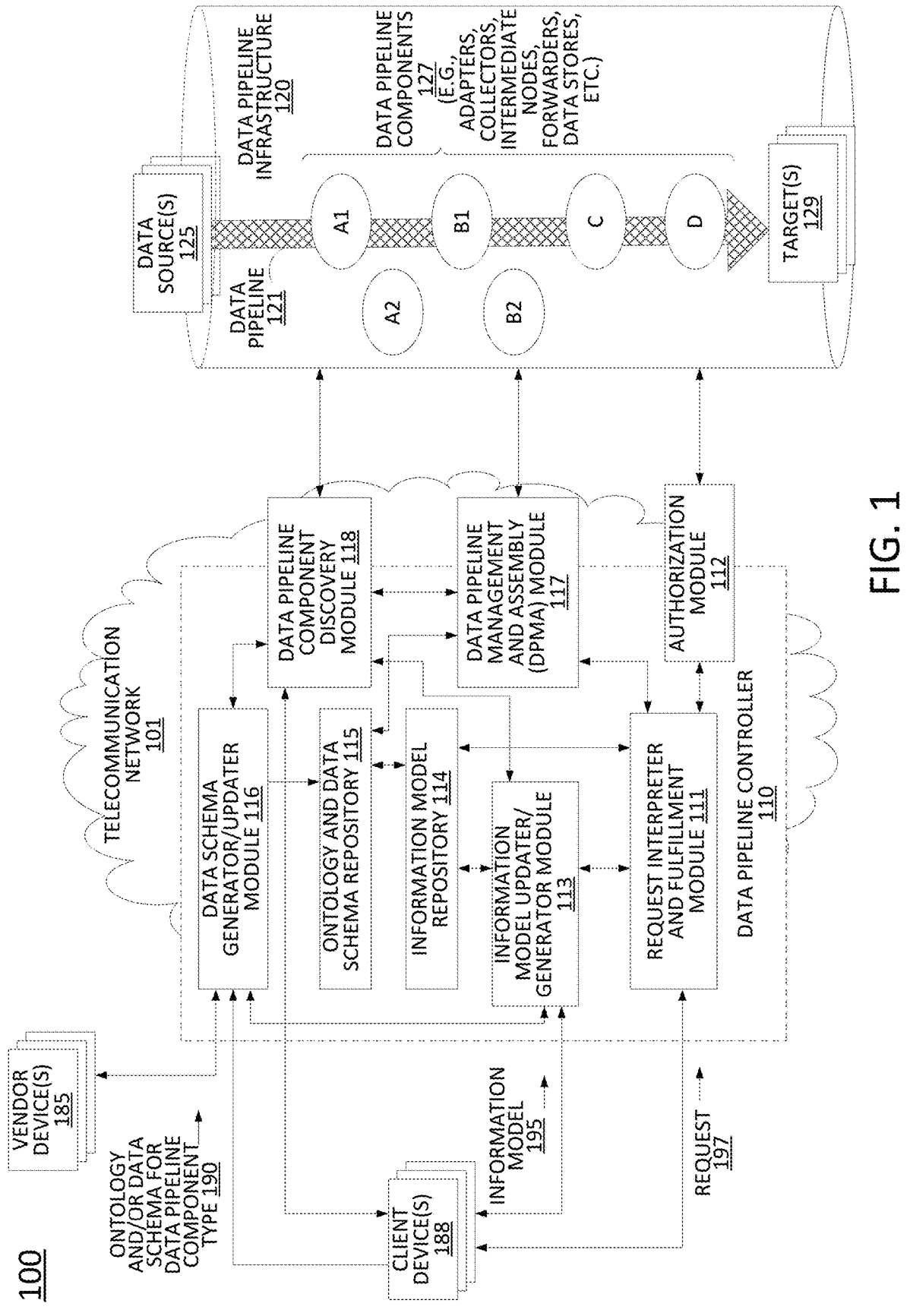
FIG. 1 illustrates an example network related to the present disclosure.

Examples of the present disclosure include a system for data pipeline configuration and management, which may be referred to as a data pipeline controller, or a Data Pipeline Intelligent Controller (DPIC). A data pipeline controller may control all the elements of a data pipeline to enable the data pipeline to create a suitable response to satisfy a client request. The functions, or modules of a data pipeline controller may include, but are not limited to: schedulers, request interpreters, various artificial intelligence/machine learning modules, policy functions, security and privacy enforcement modules, assurance functions, negotiation functions, orchestrators, databases, an abstract symbol manipulator module, a model data schema generator/updater, and so forth.

In one example, a data pipeline controller of the present disclosure may create new schemas to handle new source data retrievals and/or to integrate new data pipeline component types, and may assemble and tear down data pipelines in real-time. In one example, a data pipeline controller is flexibly expandable via add-ons, plug-ins, helper applications, and the like. When a client, such as a data scientist, a network operator, or the like seeks to obtain specified data sets from multiple sources, e.g., to provide to one or more machine learning models as target(s), the client may provide the request by specifying the desired data and the desired target(s), and the data pipeline controller may automatically generate an end-to-end plan to obtain and transmit the right data from the right source(s) to the right target(s). Thus, the present disclosure provides for intelligent control of data pipelines via a data pipeline controller that automatically integrates and directs data pipeline components at a higher level of abstraction. Data pipelines may be constructed dynamically, and on an as-needed basis such that even complex or demanding client requests may be fulfilled without (or with minimal) human interaction, and without component-specific human expertise regarding the various data pipeline components.

In many cases, a data pipeline or its associated support functions are in existence but the data pipeline itself may be inactive. In other cases, a data pipeline may not be physically or virtually established, but all the support functions are available in the cloud. In response to a request for data transfer, examples of the present disclosure may activate an inactive data pipeline or may form a new data pipeline in real-time. Examples of the present disclosure may further include features for: security, access, authentication, and authorization (AAA), (for instance, a requestor may not have the right to a data set; the present disclosure may take the role to gain rights for protected data set(s)), accounting services, proxy creation, protocol setting, payment settlement, and so on.

In one example, a data pipeline component discovery module of a data pipeline controller continuously discovers new or changed conditions in a data pipeline infrastructure. In one example, the data pipeline controller may determine how to fulfill data requests with alternative mechanisms. For instance, the data pipeline controller may determine if intermediate nodes or data stores could be established to improve efficiency or other performance/quality aspects. In one example, a result of a request may be stored as a copy in a source node, in a specified intermediate node, or at one or more target nodes, such that the result may be reused for one or more subsequent requests. The purpose is not to replace the data pipeline's native data fulfillment functions, but rather to assist, suggest, or command how the data pipeline handles its fulfillment aspects.

Examples of the present disclosure also ensure that data is well understood. For instance, data sources may be indexed and a requestor may learn upfront what data is available. In accordance with the present disclosure, a data pipeline may be dynamically established and subsequently torn down. Thus, a data pipeline may not always be a persistent entity. In one example, a data pipeline controller of the present disclosure is aware of each data pipeline that is in existence, and knows each data pipeline's history. In addition, in one example, if a request cannot be automatically satisfied, the data pipeline controller may provide meaningful explanation of the gaps, which may allow data scientists working offline to improve tools/modules at the data pipeline level.

A data pipeline controller of the present disclosure and/or various modules thereof may be configured for several use patterns, e.g., including but not limited to: inquiry/browsing, request template/specification and analysis/planning, data source/data pipeline indexing, notification, and request and fulfillment. Interactions of the data pipeline controller with other entities in these patterns may be via any appropriate means, such as: direct or indirect communications; forwarded, routed, or switched communications; application programming interfaces (APIs); bus messages; subscribe-publish events; etc.

Inquiry/browsing—This pattern may be used to verify if a data pipeline controller can arrange the fulfillment of an inquiry. For example, a requestor may browse a data pipeline catalog to select particular data or data set(s), and may send an inquiry to the data pipeline controller, which may then determine and respond with availability (and potentially commitments, reservations, verifications, etc.) along with associated information related to the data/data set(s) that is/are identified in the inquiry, such as: estimated freshness, latency, quality, etc.

Request template/specification and analysis/planning—A requestor may send an actual request to the data pipeline controller for simulated processing, such as a particular template/specification of desired data or data set(s). The data pipeline controller may command and coordinate with data pipeline components to perform analysis, search, planning of functional steps, and so forth, in order to provide informative responses. For example, in some cases the data pipeline controller may return one or more of three potential responses: (1) requesting that more information should be provided, (2) indicating that special authorization may be needed, and (3) providing example(s) of full data/data set response (if possible) or partial data/data set response (e.g., if the requested data/data set(s) is/are large, if "1" or "2" also apply, etc.).

In one example, information models may have associated request templates which may be predefined (e.g., by a creator/administrator of an information model) and/or which may be learned over time as requests are matched to different information models, as feedback on the quality and correctness of the matching is provided by client request submitters, and so forth. In one example, multiple request templates may be stored and maintained in association with an information model. For instance, the same information model may be matched to different requests, which may all relate to a same general type of data delivery, but with somewhat different specifics, such as one or more different data sources, one or more different targets, with or without an intermediate storage node, etc.

It should be noted that information models and associated request templates may have more or less detail, and more or less fixed and/or configurable parameters depending upon the preferences of a system operator, a creator of an information model, etc. For instance, in one example, an information model and/or an associated request template may be for obtaining specific data from specific data sources and delivering to selected targets. In other words, the data and data sources may be fixed and are not further selectable (at least with this particular example information model). However, another information model may be for obtaining selectable data from selectable data sources within a specific area for delivery to selectable targets. In other words, the location or region may be fixed, while the data and the data sources are not fixed and can be selected (e.g., via a request that is crafted in accordance with an associated request template and/or via a custom crafted request that is mapped to the information model). In one example, the request template/specification and analysis/planning use pattern may include providing access to a catalog of request templates from which a client may select a template for use (e.g., for simulated or actual fulfillment of a request).

Data source/data pipeline indexing—The data pipeline controller may add new data sources (or even full data pipelines) to a catalog of data pipeline infrastructure components.

Notification—The data pipeline controller may notify requestors and/or subscribers of new data pipeline components or data pipeline component types. For instance, when a new data pipeline component or data pipeline component type is discovered, the data pipeline controller may notify previous requestors and/or publish/post notifications to those who previously subscribed to the notification messages (e.g., of the particular scope of the new findings).

Request and fulfillment—Stored data set(s) or stream data may be obtained by a requestor or an automated system sending a request or trigger to the data pipeline controller. The request/trigger may be simple in some cases, but may be expected to include (directly or by reference) detailed specification information such that the appropriate data or data set(s) can be identified, prepared, and provided. In one example, the data pipeline controller may first check if the same or a similar request has recently gone through the request template/specification and analysis/planning pattern (e.g., as outlined above), and if so, some portion of the fulfillment process may be omitted for the sake of efficiency (e.g., if various safety/quality assurance criteria are met). For instance, the request specification may be sent to data sources and resulting data may be joined in appropriate node(s) in order to avoid unnecessary work, with final data/data set(s) then being delivered to the requestor.

Feedback—This pattern enables a requestor to provide feedback to the data pipeline controller regarding its automated actions. For instance, a data requester may provide data usage/quality feedback to the data pipeline controller, which can then use the feedback to fine tune various relevant data manipulation processes.

Discovery—this pattern enables the data pipeline controller to discover functionalities of data pipeline functions. The discovery pattern may include two aspects. (1) Proactive discovery, in which a pre-specified model (e.g., information model) may be provided to the data pipeline controller. Based on scheduling and the information model specification, the data pipeline controller may proactively discover newly formed data pipeline components (and/or data pipeline component types) or may discover updates to data pipeline components (and/or data pipeline component types) that may have been modified. (2) Reactive discovery, in which each data pipeline component, once instantiated or modified, may notify the data pipeline controller of its existence. In some cases, where the data pipeline controller engages in a proactive discovery role, the data pipeline controller may follow what is defined in an information model and may verify the existence of underlying data pipeline components (e.g., one or more instances of data pipeline component types which is/are identified in the information model). An information model may also be leveraged in a "reactive" model. In this case, data pipeline components may notify the data pipeline controller of the components' whereabouts and details.

In addition, in one example, when the data pipeline controller becomes aware of a new data source or other data pipeline component (or a new data source type and/or a new data pipeline component type), the data pipeline controller may attempt to derive a default data schema (and for a new data source, to also profile the data). The data schema may be in terms of the symbols that the data pipeline controller is made aware of (e.g., from a provided ontology). A system operator may also validate or correct the automatically-generated data schema. Additionally, the data pipeline controller may validate fresh batches of data from a data source against a previously defined data schema, and any differences in the statistical profile of the new batch versus previous batches may be noted.

Thus, examples of the present disclosure provide a framework for a data pipeline controller that supports both data request and data fulfillment. Users no longer need to know the details of how to acquire or reformat the data sets. This is handled by the data pipeline controller configuring the data pipeline instances. The data pipeline controller comprises various modules which collectively function to decompose a single data request into sub-parts. In one example, a data pipeline controller of the present disclosure may dynamically decide alternative ways to obtain the requested data set(s) when one or more data sources are not available. Based on a request, a data pipeline controller may dynamically command a data pipeline to create intermediate nodes which can, for example, act as temporary staging points to optimally accomplish sharing/reuse for performance gains. In addition, a data pipeline controller of the present disclosure may generate data schema(s) for new types of data sources and/or data pipeline components (e.g., when data schemas are not provided with these new components). These and other aspects of the present disclosure are described in greater detail below in connection with the examples of FIGS. 1-3.

To further aid in understanding the present disclosure, FIG. 1 illustrates an example system 100 in which examples of the present disclosure for generating a data schema for a type of data pipeline component and storing an ontology and the data schema for the type of data pipeline component in a catalog of data pipeline component types may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VOIP) networks, Service over IP (SoIP) networks, and the like.

In one example, the system 100 may comprise a telecommunication network 101. Telecommunication network 101 may combine core network components of a cellular network with components of a triple play service network; where triple-play services include telephone services, Internet services and television services to subscribers. For example, telecommunication network 101 may functionally comprise a fixed mobile convergence (FMC) network, e.g., an IP Multimedia Subsystem (IMS) network. In addition, telecommunication network 101 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VOIP) telephony services. Telecommunication network 101 may further comprise a broadcast television network, e.g., a traditional cable provider network or an Internet Protocol Television (IPTV) network, as well as an Internet Service Provider (ISP) network. In one example, telecommunication network 101 may include a plurality of television (TV) servers (e.g., a broadcast server, a cable head-end), a plurality of content servers, an advertising server (AS), an interactive TV/video on demand (VOD) server, and so forth. For ease of illustration, various additional elements of telecommunication network 101 are omitted from FIG. 1.

The telecommunication network 101 may be in communication with data pipeline infrastructure 120 and the Internet in general (not shown). In one example, the data pipeline infrastructure 120 may comprise a "public" cloud or "private" cloud infrastructure. For instance, all or a portion of the data pipeline infrastructure 120 may be controlled by a same entity as telecommunication network 101. In such an example, the data pipeline infrastructure 120 may be considered part of the telecommunication network 101. Alternatively, or in addition, all or a portion of the data pipeline infrastructure 120 may be controlled by and/or operated by another entity providing cloud computing services to clients/subscribers. The data pipeline infrastructure 120 may include a plurality of data pipeline components 127, such as adapters, collectors, intermediate nodes, forwarders, data stores, and so forth. The data pipeline infrastructure 120 may comprise servers/host devices (e.g., computing resources comprising processors, e.g., central processing units (CPUs), graphics processing units (GPUs), programmable logic devices (PLDs), such as field programmable gate arrays (FPGAs), or the like, memory, storage, and so forth), which may provide virtualization platforms for managing one or more virtual machines (VMs), containers, microservices, or the like. For instance, in such case the data pipeline components 127 may comprise virtual machines, containers, microservices, or the like, which may provide the various functions of data pipeline components, such as a collector, an adapter, a forwarder, etc. In one example, the data pipeline components 127 may also include dedicated hardware devices, e.g., one or more servers that may comprise one or more adapters, collectors, intermediate nodes, etc. and which may be configured to operate in various data pipelines (but which may not be readily adaptable to provide a different type of service). In one example, the data pipeline components may each comprise a computing system or server, such as computing system 300 depicted in FIG. 3, and may be configured to provide one or more operations or functions in connection with examples of the present disclosure for generating a data schema for a type of data pipeline component and storing an ontology and the data schema for the type of data pipeline component in a catalog of data pipeline component types, as described herein.

In one example, the data pipeline infrastructure 120 may also include one or more data sources 125 and one or more targets 129. However, in another example, these devices or systems may be considered to be outside the data pipeline infrastructure 120. The data sources 125 may include network devices, e.g., routers, switches, multiplexers, firewalls, traffic shaping devices or systems, base stations, remote radio heads, baseband units, gateways, and so forth. The data from the data sources 125 may therefore comprise various types of network operational data, such as: channel quality information, a number of endpoint devices served by a base station, records and/or alerts regarding network anomaly detections, throughput information, link connectivity information, port utilization metrics, and so on. In one example, the data sources 125 may alternatively or additionally comprise sensor devices, e.g., temperature sensors, humidity sensors, wind speed sensors, magnetometers, pressure sensors, etc. Thus, the data from data sources 125 may comprise measurements of temperature, humidity, wind speed, pressure, magnetic field strength and/or direction, and so forth. In still another example, the data sources 125 may alternatively or additionally include digital still and/or video cameras, photograph and/or video repositories, medical imaging repositories, financial data storage systems, medical records storage systems, and so forth. Accordingly, the data that is available from data sources 125 may alternatively or additionally include, images, videos, documents, and so forth. It should be noted that data from various data sources 125 may be filtered and transformed to achieve one or more data sets and/or subsets of data that can be common across a set of data pipelines and data pipeline instances. In one example, the targets 129 may comprise various devices and/or processing systems, which may include various machine learning (ML) modules hosting one or more machine learning models (MLMs). For instance, a first one of the targets 129 may comprise a MLM to process image data and may be trained to recognize images of different animals, a second one of the targets 129 may comprise a MLM to process financial data and may be trained to recognize and alert for unusual account activity, and so forth. Targets 129 may also include user endpoint devices, storage devices, and so forth.

Figure 2:
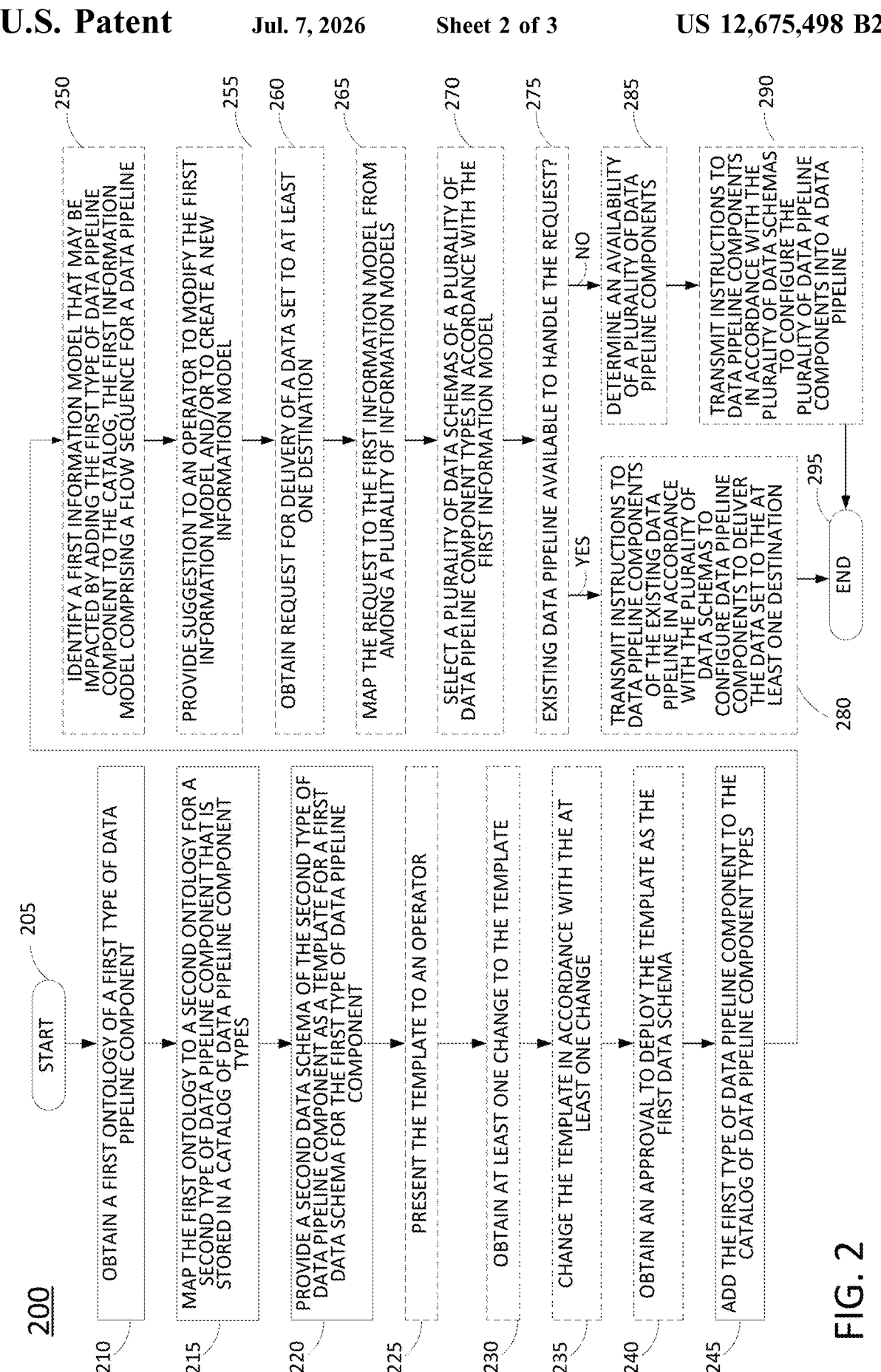
FIG. 2 illustrates a flowchart of an example method for generating a data schema for a type of data pipeline component and storing an ontology and the data schema for the type of data pipeline component in a catalog of data pipeline component types.

As further illustrated in FIG. 1, telecommunication network 101 may include a data pipeline controller 110. In one example, the data pipeline controller 110 may comprise a computing system or server, such as computing system 300 depicted in FIG. 3, and may be configured to provide one or more operations or functions for generating a data schema for a type of data pipeline component and storing an ontology and the data schema for the type of data pipeline component in a catalog of data pipeline component types, as described herein. For instance, a flowchart of an example method 200 for generating a data schema for a type of data pipeline component and storing an ontology and the data schema for the type of data pipeline component in a catalog of data pipeline component types is illustrated in FIG. 2 and described in greater detail below.

Figure 3:
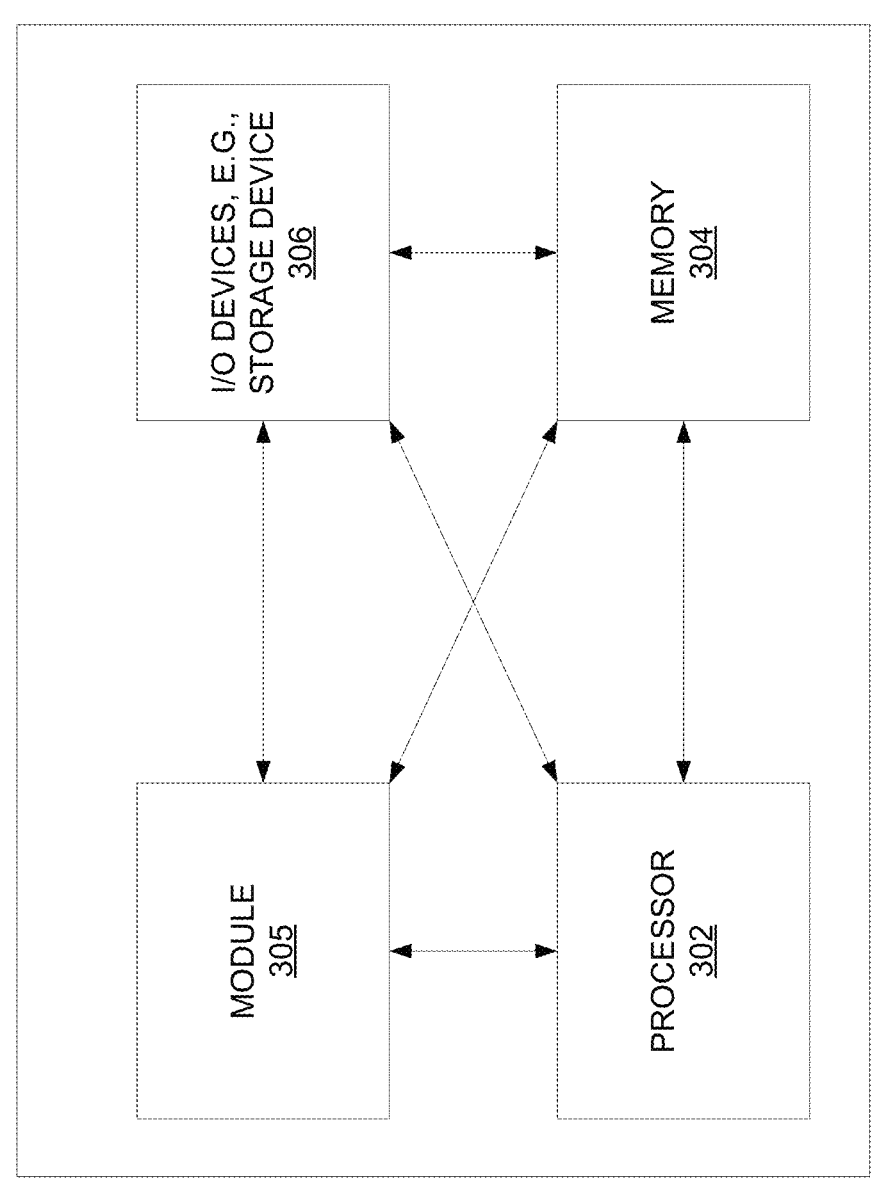
FIG. 3 illustrates a high level block diagram of a computing device specifically programmed to perform the steps, functions, blocks and/or operations described herein.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, the data pipeline controller 110 may include a plurality of modules 111-118 which provide for particular functions of the data pipeline controller 110. For instance, each component/module 111-118 may comprise respective code, executable images, etc., that can be loaded into memory and executed by one or more processors to collectively comprise an operational data pipeline controller 110.

As noted above, each of the data pipeline components 127 may have a data pipeline component type, such as an adapter, collector, forwarder, etc. In one example, for each data pipeline component type, the data pipeline controller 110 may store a respective data schema in the ontology and data schema repository 115. A data schema for a data pipeline component type establishes how a function of a data pipeline component (of the data pipeline component type) is performed at runtime. It includes relationships among data attributes along with a mini-flow (or micro-level flow sequence). In addition, for each data pipeline component type, the ontology and data schema repository 115 may also store a respective ontology for the data pipeline component type. An ontology defines what an instance of the data pipeline component type is and the functions of the data pipeline component instance (e.g., Vendor 3 Adapter 6 Version 2) and its functions (but does not define how the functions are used—this is provided by the data schema). It should also be noted that insofar as the data sources 125 and targets 129 may comprise part of a data pipeline, these devices or systems may also have respective data pipeline component types for which respective ontologies and associated data schemas may be stored by the ontology and data schema repository 115.

In general, an ontology defines classes (also referred to as "concepts" or "attributes") and properties (also referred to as "slots") defining features of the classes. As described herein, each data pipeline component type has its own ontology. However, in some taxonomies, each data pipeline component type may comprise its own "class" in a singular ontology or knowledge base of "data pipeline component types" with additional attributes of the data pipeline component type comprising "sub-classes" in one or more layers below the "class" layer. The ontologies for different data pipeline component types may thus be considered "classes" according to some interpretations. In one example, the format of an ontology may be defined by an operator of the data pipeline controller 110. For instance, an ontology format may have a hierarchy of layers or levels, there may be certain required classes, certain required properties, etc., certain required class restrictions, certain required values for one or more properties, class restrictions, etc., and so on.

In one example, for each new data pipeline component type that becomes available, a vendor may provide an associated ontology. In some cases, a vendor of a new data pipeline component type may also provide an associated data schema. This is illustrated in FIG. 1 where an ontology and/or data schema for a data pipeline component type 190 may be input to the data schema generator/updater module 116. For instance, the ontology and/or data schema for a data pipeline component type 190 may be provided via one of the vendor devices 185. In an example where the vendor has provided both an ontology and a data schema, the data schema generator/updater module 116 may simply store a record for the new data pipeline component type comprising the ontology and the data schema in the ontology and data schema repository 115. However, where only an ontology is provided, the data schema generator/updater module 116 may automatically generate a data schema based upon the ontology and store the record comprising the ontology and the data schema in the ontology and data schema repository 115.

In particular, the data schema generator/updater module 116 may determine a similarity between the new type of data pipeline component and one or more existing types of data pipeline components having records in the ontology and data schema repository 115. In one example, the similarity between the new type of data pipeline component type and an existing type of data pipeline component may be quantified based upon a congruence between the ontology of the new type of data pipeline component (e.g., a first ontology) and the ontology of the existing type of data pipeline component (e.g., a second ontology). For example, the congruence may be based upon a number of matches between classes, properties, and/or class restrictions (broadly, "features") of the first ontology and the classes, properties, and/or class restrictions (e.g., "features") of the second ontology. In one example, there may be different weights applied for matches among different features e.g., depending upon the level of the features within a hierarchy of the ontology format, for example.

In one example, the data schema generator/updater module 116 may copy or provide the data schema for the best matching (e.g., the highest congruence measure or score) existing type of data pipeline component as a template for a data schema for the new type of data pipeline component. In one example, the data schema generator/updater module 116 may provide a notification to an operator of the data pipeline controller 110, e.g., at one of the client devices 188, indicating the automatic selection of a data schema template for the new type of data pipeline component. In one example, the operator may then approve of the template for use as the data schema for the new type of data pipeline component. In one example, the operator may make changes or modifications to the template, and provide the changes/modifications to the data schema generator/updater module 116. In one example, data schemas for a top X matching data pipeline components may be returned to the operator, from which the operator may browse and select one of the data schemas as a template (and which may be unmodified, or which may be modified by the operator) that is returned to the data schema generator/updater module 116. Thus, the operator may verify that the data schema generator/updater module 116 is generating valid data schemas. The data schema generator/updater module 116 may then store the template (either modified or unmodified) as the data schema for the new type of data pipeline component, along with the respective ontology, in the ontology and data schema repository. Instances of the new type of data pipeline component may then be made available for use in the data pipeline infrastructure 120.

To support the fulfillment of requests by the data pipeline controller 110, there may be a catalog of predefined "information models," stored in information model repository 114. The information models may comprise specifications for data pipelines for various use cases. For instance, in one example each "task type" may have an associated information model. In another example, there may be a number of information models associated with each task type. For instance, a first information model associated with the task type of "market intelligence" may relate to "cellular," and a second information model associated with the task type of "market intelligence" may relate to "VoIP". In one example, each information model may be associated with or may comprise metadata relating to one or more of: a name, a region, a task type, a technology, and various other types of parameters. As illustrated in FIG. 1, an information model 195 may be submitted by an operator via one of the client devices 188 to the information model updater/generator module 113, which may store the information model in information model repository 114. Once stored in the information model repository 114, the information model 195 may then be used in fulfillment of requests (e.g., requests which are matched to the information model 195).

As noted above, each information model may comprise a specification for a data pipeline. For instance, each information model may comprise hooks to a plurality of data schemas. The data schemas may be for a plurality of data pipeline component types. As also noted above, the data schemas are specific to particular component types, and provide information on how each of the data source(s) and/or data pipeline component 127 may be utilized, accessed, interacted with, etc. For instance, data pipeline components 127 may include components of various component types, such as: adapters, collectors, intermediate nodes, forwarders, data stores, and so forth. For instance, data pipeline components 127 may include two components of type "A" (e.g., A1 and A2), two components of type "B" (e.g., B1 and B2), and one component each of component types "C" and "D." In the present example, information model 195 may comprise or provide a specification which may result in the establishment and/or reconfiguration of the data pipeline 121, which may include A1, B1, C, and D from data pipeline components 127. In one example, the information model, or specification, may include a plurality of mini-specifications for driving data retrievals and data joins. For instance, each mini-specification may be tailored to a respective data source (or data source type). In one example, a higher-level specification may be delivered to intermediate points to merge data streams. The specification(s) may be configured based upon the data schemas of respective data pipeline component types and the overall sequence of the information model 195.

A mini-specification may also be tailored to a set of pipeline instances where data from a more general view is filtered or enriched for their instance-specific scopes. For example, data fulfillment, management and assembly modules may efficiently optimize synergies across pipeline requirements, maintain data source updates from sources, and utilize transformation processes to map those updates to pipeline instance requirements, and manage filtering, enriching, and propagating the updates into pipeline instances for data ingestion. Using the information models and data pipeline requirements, the data pipeline controller may optimize pipeline infrastructure workload requirements to maximize and manage synergies across existing/new data pipeline controller types to ensure data source updates occur to fulfill data pipeline instance requirement and service level agreements (SLAs), and to further achieve economies of scale.

In one example, a new information model, such as information model 195, may lead to the discovery of a new data pipeline component type. For instance, an information model may assume the existence of a data pipeline component type for which there is no record in the ontology and data schema repository 115. In such case, the information model updater/generator module 113 may notify the operator via the client device 188 that an ontology and data schema are missing for this assumed-to-be new data pipeline component type. In one example, the operator of client device 188 may provide an ontology, a data schema, or both, which may be provided to the data schema generator/updater module 116. In another example, the operator may contact a vendor, which may be requested to provide an ontology and/or a data schema.

To further illustrate the functions and features of data pipeline controller 110, an example request 197 for delivery of data from one or more of the data sources 125 to one or more of the targets 129 may be processed by the data pipeline controller 110 as follows. First, the request 197 may be crafted via a client device 188, which may specify a desired delivery of data from one or more of the data sources 125 to one or more of the targets 129. It should be noted that in one example, the request 197 may comprise a "trigger," e.g., where the requesting client device 188 is an automated system. The request 197 may identify specific types of data, specific fields of data, specific sources or types of sources, geographic locations of sources or logical groupings of sources (e.g., all routers within a given network region, all devices in a subnet, all base stations in a selected state, wind speed information for a selected geographic area for a selected time period, all captured images or video in a selected area for a selected period of time, etc.). In one example, a user may generate the request 197 in accordance with a request template, such as in accordance with the example request template/specification and analysis/planning use pattern described above.

In one example, the request 197 may initially be received and processed via the request interpreter and fulfillment module 111 of data pipeline controller 110. The request interpreter and fulfillment module 111 may first attempt to match the request 197 to a most applicable information model. For instance, the request interpreter and fulfillment module 111 may first parse the request to determine which data sources 125 are implicated, the data of data sources 125 that is being requested, the target(s) 129 to which the data is to be delivered, etc. The request 197 may be simple in some cases, but may include (directly or by reference) detailed specification information such that the appropriate data or dataset(s) can be identified, prepared, and provided. Note that in some cases, the request interpreter and fulfillment module 111 may first check if a same request has recently been processed by the data pipeline controller 110, and if so, some portions of the fulfillment process may be omitted for the sake of efficiency (e.g., if various safety/quality assurance criteria are met). For instance, a specification for the request 197 may be sent to data sources 125 and resulting data may be joined in appropriate node(s) (e.g., data pipeline components 127) in order to avoid unnecessary work, with final data/dataset(s) then being delivered to the desired target(s) 129. Otherwise, additional analysis and planning may first be executed.

In one example, the request interpreter and fulfillment module 111 may be configured to process requests that may be in accordance with various Data Definition Languages (e.g., Structured Query Language (SQL), extensible Markup Language (XML) Schema Definition (XSD) Language, Java Script Object Notation (JSON) Schema, etc.). In one example, the request interpreter and fulfillment module 111 comprises an abstract symbol manipulator that extracts symbols from data definition languages and handles rules relating the symbols. As such, the data pipeline controller 110 may handle any data for which descriptor symbols have been provided.

In one example, the data pipeline controller 110 may map the request 197 to a most appropriate information model. For instance, the request 197 may comprise metadata relating to one or more names (e.g., of one or more of the data sources 125, targets 129, types of data sources, and/or types of targets, etc.), one or more regions (e.g., a town, a county, a state, a numbering plan area (NPA), a cell and/or a cluster of cells, a subnet, a defined network region (e.g., a marketing area), etc.), one or more task types (e.g., "market intelligence," "network load balancing," "media event support" (e.g., data analysis for large network-impacting events, such as for large concerts, sporting events, etc.), and so forth), a technology (e.g., cellular, Voice over Internet Protocol (VoIP), fiber optic broadband, digital subscriber line (DSL), satellite, etc.), and/or various additional parameters. Such metadata, or parameters, may be explicitly defined in the request 197 as particular metadata fields or may be extracted from the terms of the request 197 (e.g., identified in a query in accordance with a particular Data Definition Language). In any case, the request interpreter and fulfillment module 111 may identify various metadata/parameters of the request 197 and may provide such terms to the information model repository 114.

The information model repository 114 may store a plurality of "information models" (e.g., a catalog or data store). The information models may comprise specifications for data pipelines for various use cases. For instance, in one example each "task type" may have an associated information model. In another example, there may be a number of information models associated with each task type. For instance, a first information model associated with the task type of "market intelligence" may relate to "cellular," and a second information model associated with the task type of "market intelligence" may relate to "VoIP." In one example, each information model may be associated with or may comprise metadata relating to one or more of: a name, a region, a task type, a technology, and various other types of parameters.

In one example, the information model repository 114 may map the request to one or more of the information models. For instance, the information model repository 114 may map the request to the at least the first information model based upon a congruence between the metadata of the request and the metadata of each of the one or more information models. For instance, an information model having metadata that most closely matches the metadata of the request 197 may be identified. In one example, the top X information models having the closest matches to the metadata of the request 197 may be identified. The matching of the request 197 to each information model may be scored based upon a number of metadata fields that match. In one example, some fields may be weighted such that a match (or lack thereof) with respect to a given metadata field may have a greater or lesser impact on an overall score for the congruence, or match, between a given request and a particular information model. In one example, the top matching information model, or the top X matching information models may then be returned to the request interpreter and fulfillment module 111. It should be noted that in another example, the matching may be performed via the request interpreter and fulfillment module 111. For instance, the request interpreter and fulfillment module 111 may scan the information models in the information model repository 114 to determine matching scores for different information models. However, in any case, the request interpreter and fulfillment module 111 may select one of the information models (e.g., the top matching information model) for use in establishing and/or reconfiguring a data pipeline to fulfill the request 197. It should be noted that in one example, the request 197 may be submitted in accordance with a request template that may be matched to the information model 195. In such case, the request interpreter and fulfillment module 111 may select the information model 195 based upon the stored association between the request 197 and the information model 195. It should also be noted that in one example, the request interpreter and fulfillment module 111 may provide user tendency, and behavioral tracking and analytics. For instance, the request interpreter and fulfillment module 111 may provide an enhanced user experience in which the request interpreter and fulfillment module 111 may recognize the requestor and may use the past tendency to quickly identify and suggest one or more relevant information models.

In one example, the request interpreter and fulfillment module 111 may provide a notification of the selected information model(s) to the client device 188 that submitted the request 197. In one example, the notification may provide an opportunity for the client device 188 to submit a confirmation to the request interpreter and fulfillment module 111 to proceed with the selected information model (or instead to select one of the suggested information models for use). Likewise, the notification may provide an opportunity for the client device 188 to decline a selected information model. In such case, the request interpreter and fulfillment module 111 may provide one or more additional information models as suggestions (e.g., one or more of the next top X of the closest matching information models). Alternatively, or in addition, the notification may provide the client device 188 with the opportunity to modify a selected information model, or to create a new information model using the selected information model as a template (e.g., along with possible additional modifications). For instance, a user of the client device 188 submitting the request 197 may be aware of a new type of data pipeline component that is desired to be included in the eventual data pipeline. As such, the user may modify the information model and submit as a change to the information model, or may submit as a new information model.

In one example, for each new information model that is submitted, and/or for each information model that is modified, the information model updater/generator module 113 may verify that data source(s) 125, data pipeline component(s) 127, and/or target(s) 129 exist that are of the types of data source(s), data pipeline component(s), and/or target(s) indicated in the specification of the information model, and which are permitted to be controlled via the data pipeline controller 110. In other words, the information model/ updater generator module 113 may first verify that the data pipeline infrastructure 120 is able to fulfill requests that may invoke the information model. In one example, the information model updater/generator module 113 may communicate with the data pipeline component discovery module 118 to complete this task. For instance, data pipeline component discovery module 118 may maintain an inventory of all of the available data pipeline infrastructure 120 (e.g., data source(s) 125, data pipeline components 127, target(s) 129, etc.).

In one example, each time a component is added to the data pipeline infrastructure 120, a notification may be provided to the data pipeline component discovery module 118. For instance, each of the data pipeline components 127 may be configured to self-report an instantiation and/or a deployment. Alternatively, or in addition, a software defined network (SDN) controller that is responsible for deploying one of the data pipeline components 127 may transmit a notification to the data pipeline component discovery module 118. Similarly, a user who is responsible for deploying one of the data pipeline components 127 may be responsible for a notification to the data pipeline component discovery module 118 (e.g., via one of the client devices 188).

It should be noted that new information models may be submitted in connection with a request fulfillment process, or may be submitted without connection to a particular request. For instance, a user may develop an information model for a new anticipated use case, without having a specific request for which a data pipeline is to be immediately built. In one example, a user, e.g., via one of the client devices 188 may browse the catalog of the information model repository 114 and may utilize any existing information models as a template for a new information model. As illustrated in FIG. 1, the interactions of data pipeline controller 110 and one of the client devices 188 for generating and/or submitting a new information model may be via information model updater/generator module 113. However, in another example, the information model repository 114 may alternatively or additionally comprise an application programming interface (API) which may allow more direct access of the catalog of information models from the one of the client devices 188. In one example, user objects, information model objects, and data pipeline component type objects are all first class citizens in the architecture so any user could act on (view) any information model/template or data pipeline component type. In addition, there may be no unnecessary hierarchical control imposed over the inventories that would reduce data sharing and limit automation. In accordance with the present disclosure, each object may have an intrinsic identity, may be dynamically constructed at runtime, and may be passed as a parameter.

Once an information model is selected and finalized (e.g., approved for use and/or not objected to), the request interpreter and fulfillment module 111 may also verify that the client device 188 and/or a user thereof is authorized to create a data pipeline with regard to the data being requested, that the desired target(s) 129 are permitted to receive the requested data, that the client device 188 and/or a user thereof is permitted to utilize particular data pipeline components types that are indicated in the specification, and so forth. For instance, the request interpreter and fulfillment module 111 may submit the specification to authorization module 112 along with an identification of the one of the client devices 188 and/or an identification of a user thereof. Authorization module 112 may maintain records of the permissions for various ones of the client devices 188 and/or various users or user groups, the permissions of various data pipeline component types, the permissions for specific ones of the data pipeline components 127, data source(s) 125, and/or target(s) 129, and so forth. In one example, authorization module 112 may additionally include information regarding user preferences, limitations, exception handling procedures, etc. If the records associated with the user, the one of the client devices 188, the data pipeline component type(s), etc. are indicative that a data pipeline may be built or adapted to fulfill the request 197 in accordance with the selected information model, then the authorization module 112 may return an positive confirmation, or authorization, to the request interpreter and fulfillment module 111. In addition, upon receipt of a positive confirmation/authorization the request interpreter and fulfillment module 111 may submit the selected information model (e.g., along with parameters of the request 197), to the data pipeline management and assembly (DPMA) module 117.

In one example, the DPMA module 117 is responsible for generating a data pipeline or reconfiguring a data pipeline to fulfill the request 197 in accordance with the information model that is selected (such as information model 195). For instance, the DPMA module 117 may decompose the specification of the information model 195 into mini-specifications for driving data retrieval and data joins, e.g., one mini-specification per data source. For instance, in the present example, information model 195 may comprise or provide a specification which may result in the establishment and/or reconfiguration of the data pipeline 121, which may include A1, B1, C, and D from data pipeline components 127. In one example, a higher-level specification may be delivered to intermediate points to merge data streams. To illustrate, the DPMA module 117 may determine that the information model provides a roadmap for establishing a data pipeline for delivering base station performance data from one or more data sources to one or more targets. The request parameters may provide information regarding the geographic scope of the request. In one example, the DPMA 117 may select particular data sources of data sources 125 having the requisite base station performance data in accordance with the geographic scope information. In one example, the determination may be made using information stored in data pipeline component discovery module 118.

In one example, the information model may indicate that an aggregator component is called for as a first intermediate node in data pipeline 121. DPMA 117 may determine that there are multiple aggregator components available in the data pipeline infrastructure (e.g., A1 and A2). However, DMPA 117 may select one of these in accordance with the request parameters, e.g., using the geographic scope information, using information regarding the distance or latency from the data source(s) 125 (e.g., after selecting the appropriate data source(s) 125), and so forth. For instance, in the present example, DPMA 117 may select an aggregator component A1 from the available data pipeline components 127. It should be noted that DPMA 117 may select additional data pipeline components B1, C, and D from the available data pipeline components 127 following a similar analysis.

In one example, DPMA 117 may instantiate the data pipeline 121 in response to the request 197 (or in response to an instruction from the request interpreter and fulfillment module 111 containing the selected information model and parameters of the request 127). In one example, DPMA 117 may configure the data pipeline components A1, B1, C, and D in accordance with hooks in the information model and/or specification which invoke data schemas associated with the respective data pipeline components types of the data pipeline components A1, B1, C, and D. For instance, a data schema for data pipeline component A1 may indicate the available commands which may be used to configure data pipeline component A1, the values of different arguments or parameters which may be used in one or more commands, and so forth. In one example, the hooks in the information model (e.g., information model 195) may be executed by DPMA 117 to retrieve or to invoke the respective data schemas. However, specific configuration commands may be tailored to the particular data pipeline components 127 that are selected (e.g., to direct configuration commands to A1 (and not to A2), to B1 (and not to B2), to C, and to D). Accordingly, using the various data schemas, DPMA 117 may configure the data pipeline components A1, B1, C, and D to function as data pipeline 121 and to move the requested data from the one or more of data sources 125 to one or more of targets 129.

To illustrate, data pipeline component A1 may be configured to obtain base station operational data from at least two of the data sources 125 and to aggregate the data at the node. For instance, data pipeline component A1 may utilize Apache Kafka, Data Movement as a Platform (DMaaP), nanomsg, or the like to "subscribe" to the data from the relevant data sources 125. In one example, data pipeline component A1 may also be configured to periodically forward the aggregated data to data pipeline component B1. Data pipeline component B1 may be configured to generate summary data, such as 5 minute moving averages, etc., to pare the data, such as removing extra fields, and so forth. Data pipeline component C may be configured to obtain summary data from data pipeline component B1 (e.g., again using Kafka, DMaap, nanomsg, or the like), to smooth the data and remove any outliers, and to place the processed data into a JSON format. Lastly, data pipeline component D may be configured to periodically obtain the data that is further processed from data pipeline component C, to store a copy of the processed data, and to forward the processed data to the desired one or more of targets 129.

It should be noted that in one example, parameters of the request 197 may indicate a limited temporal scope of the requested data. As such, in one example, DPMA 117 may configure the data pipeline components A1, B1, C, and D to cease the specific functions configured for data pipeline 121 after the temporal scope of the request has passed. However, it should also be noted that as indicated above, the data pipeline component discovery module 118 may maintain information regarding the availability and current configurations of data pipeline components 127, the data pipeline 121, other data pipelines, etc. As such, in one example, all or a portion of the data pipeline 121 (e.g., the configurations of any one or more of the data pipeline components A1, B1, C, and D) may be maintained after the fulfillment of the request 197, such as if a new request is received and processed by data pipeline controller 110 and if it is determined that the same data is being requested. Thus, for example, the data may be maintained in data pipeline component D for an additional time duration so as to fulfill this additional request. For instance, there may be one or more predictors that suggest that one or more of the data sources 125 may be reused again based on historical trends.

Alternatively, or in addition, the new request may be for obtaining data that partially overlaps with the data requested in request 197. For instance, the new request may be for similar base station operational data having the same geographic scope, but for a more extended time period, or for a time period that partially overlaps with a time period specified in the request 197. In such case, DPMA 117 may maintain the data pipeline 121 for an additional duration so as to obtain the additional data associated with the time period of the new request. Additional scenarios may also lead to the full or partial reuse of data pipeline 121 or other data pipelines. For instance, in another example data pipeline 121 may be integrated with another data pipeline, may be expanded with one or more additional data pipeline components to fulfill a new request (such as adding an additional aggregator for obtaining additional base station operational data from an additional geographic region), and so forth. DPMA 117 may maintain an underlying source feed process that a plurality of data pipeline instances depend on, as long as a subset of the data pipeline instances continue to exist. DPMA 117 may be able to reduce the frequency of enrichment, or lower other characteristics of one or more of the remaining data pipelines instances to compensate for new resulting requirements of any or all of the remaining data pipeline instances.

To further illustrate, in one example, data pipeline 121 may be in existence (e.g., having been created configured, and either in-use or remaining idle/in standby mode) prior to the request 197. In such case, similar to the example above, DPMA module 117 may determine that the information model provides a roadmap for establishing a data pipeline for delivering base station performance data from one or more data sources to one or more targets. The request parameters may provide information regarding the geographic scope of the request. Thus, the DPMA 117 may select particular data sources of data sources 125 having the requisite base station performance data in accordance with the geographic scope information. In one example, the determination may be made using information stored in data pipeline component discovery module 118. However, the information stored in data pipeline component discovery module 118 may also indicate that data pipeline 121 is operational within the data pipeline infrastructure 120 and is available to fulfill the request 197. In this case, the nodes of data pipeline 121 (e.g., data pipeline components A1, B1, C, and D) may be reconfigured to fulfill the request 197. For instance, the data pipeline components A1, B1, C, and D may be configured/reconfigured using commands via the respective data schema to obtain additional data within the temporal and geographic scope of the request 197, to forward the processed data to one or more of the targets 129 via data pipeline component D, and so forth.

In still another example, the DPMA module 117 may determine in accordance with the information model selected for request 197 that the requested data may already be stored, e.g., at data pipeline component D. For instance, data pipeline component D may have come into possession of the data in accordance with a different request for which the data pipeline 121 was established. In such an example, data pipeline component D may also store extra data that is not relevant to request 197. However, in such case, DPMA 117 may establish a new, shortened data pipeline to fulfill request 197. For instance, the data pipeline may comprise data pipeline component D (and in one example, the one or more target(s) 129, which may also be considered part of the data pipeline). In such case, the configuration may involve configuring the target(s) 129 as subscribers to a data feed from data pipeline component D comprising the portion of the data stored therein that is pertinent to the request 197.

It should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like, additional clouds, and so forth.

It should also be noted that the modules of data pipeline controller 110, the interrelationships and connections shown in FIG. 1, and so forth are illustrative of just one example of how data pipeline controller 110 may be organized and configured. For example, data pipeline component discovery module 118 may be split into two modules, with a separate module to keep track of active and inactive data pipelines, while data pipeline component discovery module 118 may continue to maintain an inventory of individual data pipeline components 127. In still another example, an additional module may be provided to store previously processed requests as request templates, to store request templates and the associations between request templates and information models, to provide the request templates to clients, to obtain feedback on the matching of requests and/or request templates to information models (and/or the resulting data pipelines), to learn and update associations between request templates and information models, and so forth. Thus, these and other modifications are all contemplated within the scope of the present disclosure.

FIG. 2 illustrates a flowchart of an example method 200 for generating a data schema for a type of data pipeline component and storing an ontology and the data schema for the type of data pipeline component in a catalog of data pipeline component types, in accordance with the present disclosure. In one example, the method 200 is performed by a component of the system 100 of FIG. 1, such as by the data pipeline controller 110, and/or any one or more components thereof (e.g., a processor, or processors, performing operations stored in and loaded from a memory and comprising any one or more of the modules 111-118). In one example, the steps, functions, or operations of method 200 may be performed by a computing device or system 300, and/or processor 302 as described in connection with FIG. 3 below. For instance, the computing device or system 300 may represent any one or more components of a data pipeline controller that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system. The method 200 begins in step 205 and proceeds to step 210.

At step 210, the processing system obtains a first ontology of a first type of data pipeline component. For instance, an operator of the processing system (e.g., a data pipeline controller) may define an ontology format such that a vendor providing a new type of data pipeline component may also provide an ontology associated with the new type of data pipeline component.

At step 215, the processing system maps the first ontology to a second ontology for a second type of data pipeline component that is stored in a catalog of data pipeline component types. In one example, the mapping comprises determining a similarity between the second type of data pipeline component and the first type of data pipeline component. For example, the similarity may be based upon a congruence between the first ontology of the first type of data pipeline component and the second ontology of the second type of data pipeline component. For instance, the congruence (e.g., a metric or score that quantifies the extent of the matching) may be based upon a number of matches between features of the first ontology (e.g., at least one of classes, properties, or class restrictions) and features of the second ontology (e.g., at least one of classes, properties, or class restrictions). In one example, the congruence may have different weights for matches among different features, e.g., depending upon the level of a feature within a hierarchy, for example.

At step 220, the processing system provides a second data schema for the second type of data pipeline component as a template for a first data schema for the first type of data pipeline component. For instance, step 215 may identify a second type of data pipeline component that is most similar to the first type of data pipeline component. For example, both of these types of data pipeline components comprise "collectors." In addition, in one example, both of these types of data pipeline components may be provided by a same vendor and/or may "match" with respect to one or more alternative or additional features. Accordingly, it may be observed that the second data schema is likely to provide the relevant configuration information for all or at least a significant portion of the available functions of the first type of data pipeline component.

At optional step 225, the processing system may present the template to an operator, e.g., via an endpoint device of an operator. The presentation may include options for the operator to modify, and/or to approve or deny the adoption of the template as the first data schema. It should be noted that in one example, step 220 may comprise identifying a plurality of best matching existing types of data pipeline components from the catalog and optional step 225 may comprise presenting the plurality of associated data schemas to the operator as template options.

Alternatively, the processing system may instead present the template(s) to an operator that is implemented by an automated system, e.g., a self-learning processing system or neural network. For instance, the automated system may comprise one or more artificial intelligence (AI) and/or machine learning (ML) modules which may be configured to analyze the template, to approve the template, and/or provide a modification to the template, and so forth. For instance, the automated system may be trained from past user behaviors regarding presented templates and modifications (or lack thereof) made to such templates. Over time, the automated system may learn and predict how certain modifications should be made in response to new templates that are presented. For example, several vendors of a similar type of component may have recently provided new versions which include functionality defined in a newly released industry standard for which new data schemas have already been created and/or obtained. When a next vendor releases its own new version of the same component type, the automated system may implement a similar change to the template so as to provide a new data schema (e.g., that incorporates changes to address the new functionality that is shared across all vendors newly released versions). In addition, feedback may be received over time regarding the automated decisions to further impact the learning of the automated system (e.g., via a reinforcement learning process), such that additional user observations may be omitted. It should be noted that such an automated system may be instantiated in accordance with any number of different machine learning models (MLMs) or machine learning algorithm(s). For example, a deep reinforcement learning (DRL) algorithm may be used in accordance with the present disclosure to train a deep neural network (DNN), such as a double deep Q network, and so forth.

At optional step 230, the processing system may obtain at least one change to the template from the operator (e.g., from a human or from an automated system). For instance, the operator may be aware that the new "first" type of data pipeline component is an upgraded version of the older "second" type of data pipeline component and has at least one new function. In this case, the operator may alter the template so as to include the configuration information for the at least one new function. In one example, the operator may also select among a plurality of possible templates (e.g., if presented at optional step 225).

At optional step 235, the processing system may change the template in accordance with the at least one change. In one example, the processing system may send test instructions to at least one instance of the first type of data pipeline component to verify that the function added by the modification exists.

At optional step 240, the processing system may obtain an approval of the operator (e.g., from a human or from an automated system) to deploy the template (e.g., that is modified or unmodified) as the first data schema.

At step 245, the processing system adds the first type of data pipeline component to the catalog of data pipeline component types, where the adding comprises storing the first ontology and the first data schema for the first type of data pipeline component in the catalog. In one example, the first data schema that is stored in the catalog may comprise the template that is changed at optional step 235. In one example, steps 210-245 may include functions as described above in connection with the data schema generator/updater module 116 and the ontology and data schema repository 115 of FIG. 1.

At optional step 250, the processing system may identify a first information model that may be impacted by the adding of the first type of data pipeline component to the catalog, where the first information model comprises a flow sequence for a data pipeline (as well as data attribute relationships, in one example). For instance, optional step 250 may comprise determining that the at least one information model includes at least one hook that identifies the second type of data pipeline component.

At optional step 255, the processing system may provide at least one suggestion to an operator (e.g., from a human or from an automated system) comprising at least one of: a suggestion to modify the first information model to incorporate the first type of data pipeline component or a suggestion to create a new information model (e.g., based upon the first information model and that incorporates the first type of data pipeline component). It should be noted that incorporating the first data pipeline component may comprise replacing the second data pipeline component or inserting the first data pipeline component (without replacing the second data pipeline component). It should also be noted that optional steps 250 and 255 may further apply to additional information models that may be identified as potentially being impacted by the adding of the first type of data pipeline component to the catalog. In one example, optional steps 250 and 255 may include functions as described above in connection with the information model updater/generator module 113 and/or information model repository 114 of FIG. 1.

At optional step 260, the processing system may obtain a request for a delivery of a data set to at least one destination. In one example, the request may be in accordance with a request template. In one example, the request may comprise a plurality of parameters such as the desired data set, a specific data source or data sources, one or more target(s), a relevant time period for obtaining the data of the data set (e.g., for streaming and/or real-time data) and/or a relevant time period for which stored data is being requested, a specification of geographic bounds of the requested data set, one or more network regions for which data is being requested, other keywords, and so forth. In one example, the request may be formulated in accordance with a data definition language (DDL) that may be understood by the processing system.

At optional step 265, the processing system may map the request to the first information model from among a plurality of information models. For instance, the first information model may comprise first metadata relating to at least one of a name, a region, a task type, and so forth. Similarly, the request may comprise second metadata relating to at least one of: the name (e.g., an identification of a one or more specific data sources and/or classes of data sources, one or more specific targets/destinations or classes of targets/destinations, an identifier of the requester and/or an organization of the requester, etc.), the region (e.g., a geographic indicator, an indicator of a portion of a network, a market segment, etc.), or the task type (e.g., "market intelligence," "network load balancing," "media event support," etc.). As such, the mapping may comprise mapping the request to the first information model based upon a congruence between the first metadata and the second metadata. For instance, the congruence (e.g., a metric or score that quantifies the extent of the matching) may be based upon a number of matches between the metadata parameters.

At optional step 270, the processing system may select a plurality of data schemas of a plurality of data pipeline component types in accordance with the first information model. For instance, the first information model may comprise hooks to the plurality of data schemas. In one example, optional steps 260-270 may include functions as described above in connection with the request interpreter and fulfillment module 111 and/or information model repository 114 of FIG. 1.

At optional step 275, the processing system may determine whether an existing data pipeline is available to handle the request. For example, the existing data pipeline may be determined to be available when the plurality of data pipeline components is arranged in same manner as indicated in the first information model (and hence the plurality of data pipeline components are of the correct data pipeline component types). Alternatively, the existing data pipeline may be determined to be available: (1) when it has the correct components that can be reconfigured to alternatively or additionally handle the current data delivery request, or (2) when the existing data pipeline does not have all of the specified components, but it has a sufficient number or percentage of the requisite components such that the processing system may select to modify/update this data pipeline to alternatively or additionally handle the current data request, rather than instantiate and arrange a new data pipeline.

The processing system may perform optional step 280 when it is determined that an existing data pipeline is available to fulfill the request. Specifically, optional step 280 may comprise transmitting instructions to a plurality of data pipeline components of the existing data pipeline in accordance with the plurality of data schemas to configure the plurality of data pipeline components for delivering the data set to the at least one destination. In one example, optional step 280 may further include adding one or more additional data pipeline components to the data pipeline by transmitting instructions to the one or more additional data pipeline components in accordance with respective data schemas associated with the one or more additional data pipeline components to configure the one or more additional data pipeline components to function as part of the data pipeline for delivering the data set to the at least one destination.

On the other hand, the processing system may perform optional steps 285 and 290 when it is determined that no existing data pipeline is available to fulfill the request. Specifically, optional step 285 may comprise determining an availability of a plurality of data pipeline components. For instance, optional step 285 may comprise identifying the right data pipeline components of the right data pipeline component types, e.g., finding ones that are available, have capacity, are geographically proximate or provide the best latency or other performance considering where the data is located (at the source(s) or intermediate nodes where the requested data may have been previously copied), where the destinations is/are located, and so forth. The availabilities, capacities, proximity, and so forth may be determined based upon information stored by the processing system (such as by data pipeline component discovery module 118 of FIG. 1, for example).

At optional step 290, the processing system may transmit instructions to the plurality of data pipeline components in accordance with the plurality of data schemas to configure the plurality of data pipeline components into a data pipeline, where the data pipeline is for delivering the data set to the at least one destination. In one example, optional steps 275-290 may include functions as described above in connection with the request interpreter and fulfillment module 111, data pipeline management and assembly module 117, data pipeline component discovery module 118, and/or authorization module 112 of FIG. 1.

Following step 280 or optional step 290, the method 200 proceeds to step 295 where the method ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200, such as steps 210-245 for adding additional types of data pipeline components to the catalog, steps 260-280 or steps 260-290 for additional requests for delivery of data, and so forth. In one example, the method 200 may be expanded to include obtaining an ontology and a data schema for a new type of data pipeline component (such as from a vendor of the new type of data pipeline component) and adding the new type of data pipeline component to the catalog (e.g., without performing steps 215 and 220, since the data schema is already provided). In one example, the method 200 may be expanded to include obtaining a request to search a catalog of data pipeline components and providing access to all or a portion of the catalog. In another example, the method 200 may be expanded to include providing one or more request templates to a client device and receiving a selection of one of the request templates. For instance, in such an example, the request that is obtained at optional step 260 may be in accordance with a request template. For example, a client, via a client device, may provide certain details which may be plugged-in to the template, such as specific dates, times, source(s), locations or regions, target(s), etc. In another example, the order of optional steps 235 and 240 may be reversed. In still another example, the method 200 may be expanded to include training an operator automated system and/or updating such an operator automated system to evaluate, modify, and/or approve data schema templates, e.g., in accordance with feedback regarding the utility and/or correctness of the resulting data templates. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for generating a data schema for a type of data pipeline component and storing an ontology and the data schema for the type of data pipeline component in a catalog of data pipeline component types, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for generating a data schema for a type of data pipeline component and storing an ontology and the data schema for the type of data pipeline component in a catalog of data pipeline component types (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for generating a data schema for a type of data pipeline component and storing an ontology and the data schema for the type of data pipeline component in a catalog of data pipeline component types (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:

obtaining, by a processing system including at least one processor deployed in a communication network, a request for a delivery of a data set to at least one destination;

mapping, by the processing system, the request to a first information model from among a plurality of information models, wherein the first information model comprises a flow sequence for a data pipeline;

selecting, by the processing system, a plurality of data schemas of a plurality of data pipeline component types from a catalog of data pipeline component types in accordance with the first information model, wherein the catalog of data pipeline component types comprises a first data schema and a first ontology for a first type of data pipeline component and a second data schema and a second ontology for a second type of data pipeline component, wherein the plurality of data schemas comprises the first data schema and the second data schema, and wherein the plurality of data pipeline component types comprises the first type of data pipeline component, and the second type of data pipeline component;

determining, by the processing system, a plurality of data pipeline components, wherein the plurality of data pipeline components comprises a plurality of host devices deployed in the communication network; and configuring, by the processing system, the plurality of data pipeline components in accordance with the plurality of data schemas into the data pipeline, wherein the configuring comprises transmitting one or more commands over the communication network to one or more respective data pipeline components of the plurality of data pipeline components as defined in one or more respective data schemas of the plurality of data schemas associated with the one or more respective data pipeline components, wherein the data pipeline is to deliver the data set to the at least one destination, and wherein at least one of the one or more commands is to configure at least one of the plurality of data pipeline components as a data storage node.

2. The method of claim 1, wherein the first ontology is mapped to the second ontology for the second type of data pipeline component that is stored in the catalog of data pipeline component types.

3. The method of claim 2, wherein the mapping of the first ontology to the second ontology comprises:

determining a similarity between the second type of data pipeline component and the first type of data pipeline component, wherein the similarity is based upon a congruence between the first ontology of the first type of data pipeline component and the second ontology of the second type of data pipeline component.

4. The method of claim 3, wherein the congruence is based upon a number of matches between at least one of: classes, properties, or class restrictions of the first ontology and at least one of: classes, properties, or class restrictions of the second ontology.

5. The method of claim 4, wherein the mapping comprises:

determining that a measure of the congruence between the first ontology and the second ontology exceeds measures of congruencies between the first ontology and a plurality of other ontologies of a plurality of other types of data pipeline components stored in the catalog of data pipeline component types.

6. The method of claim 1, further comprising:

identifying that the first information model is impacted by an adding of the first type of data pipeline component to the catalog of data pipeline component types; and providing at least one suggestion to an operator comprising at least one of: a suggestion to modify the first information model to incorporate the first type of data pipeline component or a suggestion to create a new information model based upon the first information model and that incorporates the first type of data pipeline component.

7. The method of claim 6, wherein the first information model further comprises data attribute relationships.

8. The method of claim 6, wherein the identifying comprises:

determining that the first information model includes at least one hook that identifies the second type of data pipeline component.

9. The method of claim 1, wherein the first information model comprises first metadata relating to at least one of:

a name;

a region;

a task type; or a technology.

10. The method of claim 9, wherein the request comprises second metadata relating to at least one of:

the name;

the region;

the task type; or the technology.

11. The method of claim 10, wherein the mapping the request comprises:

mapping the request to the first information model based upon a congruence between the first metadata and the second metadata.

12. The method of claim 1, wherein the first information model comprises hooks to the plurality of data schemas.

13. The method of claim 1, further comprising:

determining whether an existing data pipeline is available to handle the request.

14. The method of claim 13, wherein the determining and the configuring are performed when it is determined that no existing data pipeline is available to fulfill the request.

15. A non-transitory computer-readable medium storing instructions which, when executed by a processing system including at least one processor when deployed in a communication network, cause the processing system to perform operations, the operations comprising:

obtaining a request for a delivery of a data set to at least one destination;

mapping the request to a first information model from among a plurality of information models, wherein the first information model comprises a flow sequence for a data pipeline;

selecting a plurality of data schemas of a plurality of data pipeline component types from a catalog of data pipeline component types in accordance with the first information model, wherein the catalog of data pipeline component types comprises a first data schema and a first ontology for a first type of data pipeline component and a second data schema and a second ontology for a second type of data pipeline component, wherein the plurality of data schemas comprises the first data schema and the second data schema, and wherein the plurality of data pipeline component types comprises the first type of data pipeline component, and the second type of data pipeline component;

determining a plurality of data pipeline components, wherein the plurality of data pipeline components comprises a plurality of host devices deployed in the communication network; and configuring the plurality of data pipeline components in accordance with the plurality of data schemas into the data pipeline, wherein the configuring comprises transmitting one or more commands over the communication network to one or more respective data pipeline components of the plurality of data pipeline components as defined in one or more respective data schemas of the plurality of data schemas associated with the one or more respective data pipeline components, wherein the data pipeline is to deliver the data set to the at least one destination, and wherein at least one of the one or more commands is to configure at least one of the plurality of data pipeline components as a data storage node.

16. An apparatus comprising:

a processing system including at least one processor; and a computer-readable medium storing instructions which, when executed by the processing system when deployed in a communication network, cause the processing system to perform operations, the operations comprising:

obtaining a request for a delivery of a data set to at least one destination;

mapping the request to a first information model from among a plurality of information models, wherein the first information model comprises a flow sequence for a data pipeline;

selecting a plurality of data schemas of a plurality of data pipeline component types from a catalog of data pipeline component types in accordance with the first information model, wherein the catalog of data pipeline component types comprises a first data schema and a first ontology for a first type of data pipeline component and a second data schema and a second ontology for a second type of data pipeline component, wherein the plurality of data schemas comprises the first data schema and the second data schema, and wherein the plurality of data pipeline component types comprises the first type of data pipeline component, and the second type of data pipeline component;

determining a plurality of data pipeline components, wherein the plurality of data pipeline components comprises a plurality of host devices deployed in the communication network; and configuring the plurality of data pipeline components in accordance with the plurality of data schemas into the data pipeline, wherein the configuring comprises transmitting one or more commands over the communication network to one or more respective data pipeline components of the plurality of data pipeline components as defined in one or more respective data schemas of the plurality of data schemas associated with the one or more respective data pipeline components, wherein the data pipeline is to deliver the data set to the at least one destination, and wherein at least one of the one or more commands is to configure at least one of the plurality of data pipeline components as a data storage node.

17. The apparatus of claim 16, wherein the first ontology is mapped to the second ontology for the second type of data pipeline component that is stored in the catalog of data pipeline component types.

18. The apparatus of claim 17, wherein the mapping of the first ontology to the second ontology comprises:

determining a similarity between the second type of data pipeline component and the first type of data pipeline component, wherein the similarity is based upon a congruence between the first ontology of the first type of data pipeline component and the second ontology of the second type of data pipeline component.

19. The apparatus of claim 18, wherein the congruence is based upon a number of matches between at least one of: classes, properties, or class restrictions of the first ontology and at least one of: classes, properties, or class restrictions of the second ontology.

20. The apparatus of claim 19, wherein the mapping comprises:

determining that a measure of the congruence between the first ontology and the second ontology exceeds measures of congruencies between the first ontology and a plurality of other ontologies of a plurality of other types of data pipeline components stored in the catalog of data pipeline component types.

* * * * *